INVENTOR.
GEORGE H. EASH
BY [signature]
ATTORNEY

*INVENTOR.*
GEORGE H. EASH
*BY*
[signature]
ATTORNEY

United States Patent Office 2,778,880

Patented Jan. 22, 1957

2,778,880

ENDLESS MAGNETIC TAPE CARTRIDGE AND RECORDING PLAY-BACK INSTRUMENT MOUNTING SAME

George H. Eash, Toledo, Ohio, assignor to The Toledo Trust Company and Charles I. Poulsen, coexecutors of the estate of George H. Poulsen, deceased Application August 4, 1955, Serial No. 526,406

8 Claims. (Cl. 179—100.2)

This invention relates to an endless magnetic tape cartridge and its mounting on a recorder-playback instrument.

An object is to produce a novel cartridge having a relatively large endless roll of magnetic tape, such for example as would make possible the playing or recording for the period of an hour or more, the cartridge being self contained with a small loop portion of the tape exposed for engagement by the driving capstan and transducer of the associated instrument and there being means for eliminating or compensating for the harmful effects of static electricity generated by the relative movement of adjacent tape convolutions when the cartridge is in use.

Another object is to produce a new and improved brake or restraining device for the tape reel, which is effective normally to hold the reel stationary when not in use but, which is automatically released to free the reel when the cartridge is mounted in position of use on the recording-playback instrument.

A further object is to simplify and improve the construction of the component parts of the magnetic tape-containing cartridge for obviating difficulties of the tape fouling and for enabling simple and convenient assembly of the parts.

A still further object is to enable different size cartridges of the above character to be mounted on the recording-playback instrument without effecting any changes or adjustments either in the cartridge or in the instrument.

A still further object is to produce in combination with a magnetic tape cartridge, mechanism on the recording-playback instrument which accommodates the same for urging the cartridge against the driving capstan and transducer head so that so long as the instrument is in operation, the cartridge is positively retained in position of use.

A still further object is to produce mechanism on the recording-playback instrument, which, when switched to its "on" or "play" position, automatically operates parts for positively engaging the cartridge and resiliently urging same to position of use.

Other objects and advantages will hereinafter appear and for purposes of illustration but not of limitation, an embodiment of the invention is shown on the accompanying drawings in which Figure 1 is a top plan view of the magnetic tape cartridge, a portion being broken away for purposes of clarity;

Figures 1, 2:
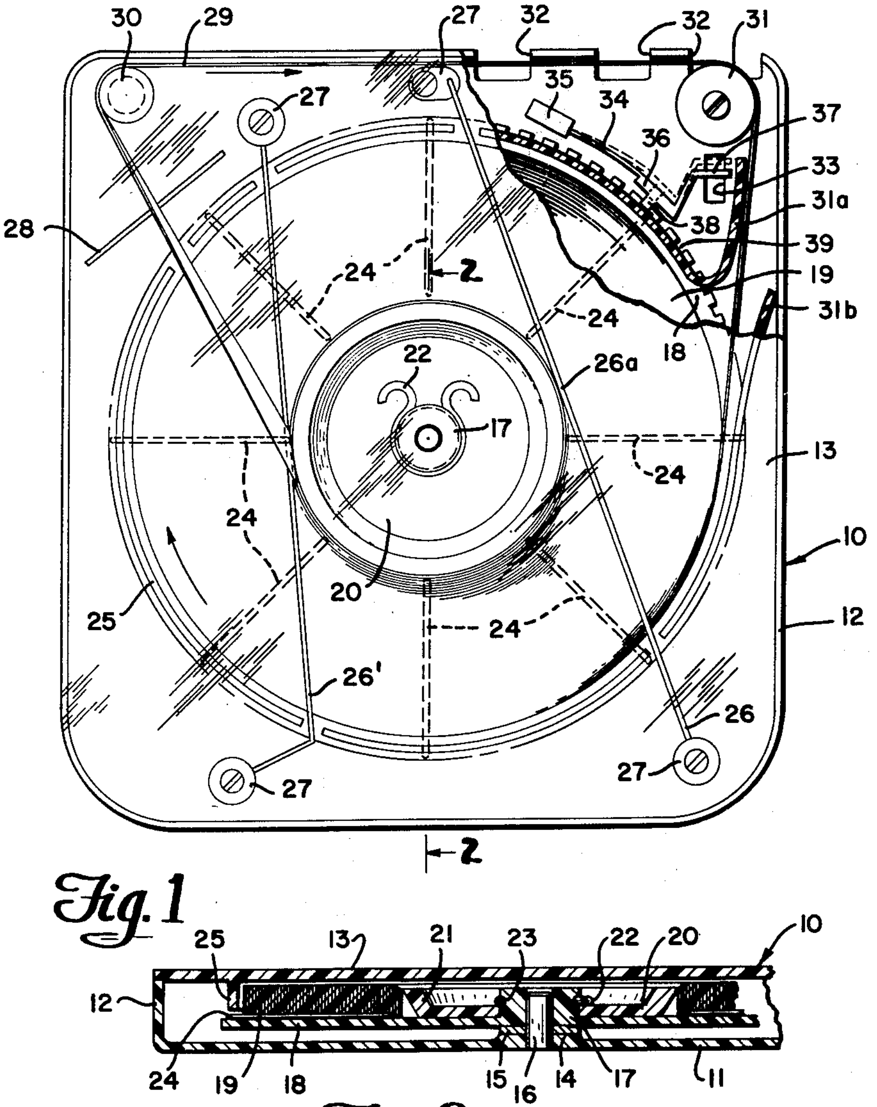
Figure 2 is a transverse sectional view substantially on the line 2—2 of Figure 1.
Figure 3:
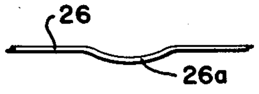
Figure 3 is a fragmentary side elevation of a portion of a guide-rod showing the downwardly bowed portion which engages a portion of the upper edges of the tape convolutions.

The illustrated embodiment of the invention, particularly as shown on Figures 1 to 3, comprises a magnetic tape cartridge 10 for use on recording-playback instruments either to record music, voices or the like or to reproduce such sounds which have been previously recorded, as will be readily undersoood by those skilled in this art. The cartridge in this instance is in the form of a substantially rectangular housing of relatively shallow depth and is formed of suitable transparent plastic. As shown, the housing has a flat bottom panel 11 with which are formed integral side walls disposed at right angles to the bottom wall and extending completely around the bottom wall to enclose same, except for cut-outs as will hereinafter appear.

Forming a cover for the housing which may be adhered to or otherwise suitably fixed to the upper edges of the side walls 12 is a flat cover panel 13 arranged in parallel relationship to the flat bottom wall 11. Both the cover panel 13 and bottom panel 11 are imperforate except that a pivot post extends through an aperture in the bottom panel as will hereinafter appear. Disposed substantially centrally of the bottom wall 11 is an upstanding boss 14 and a metallic spacing washer 15 on the boss fits over a cylindrical post 16 which has a press fit through the boss 14 and extends upwardly terminating short of the cover panel 13 to provide a pivot post or axle for the tape reel as will hereinafter appear.

Forming part of the rotatable tape reel is a flat annular disk 18 which has an integral centrally disposed upstanding hub 17 which rests upon the washer 14 and rotatably fits the post 16. The disk and its hub are also of plastic material and resting upon the reel disk 18 is an endless spiral coil or roll of magnetic tape 19. Forming the hub of the tape reel is a cup 20 also of plastic material which has a flat body provided with a central aperture fitting the cylindrical hub 17 of the disk 18 and a peripheral circular wall 20 which inclines upwardly and outwardly from the body portion of the cup. The body of the cup abuts flatly against the disk 18 and the top of the circular wall 20 terminates short of the cover panel 13 allowing a narrow space between the underside of the cover panel 13 and the wall 20. The cup 20 is detachably secured to the hub 17 by a hairpin shaped spring 22 which has snap engagement in a groove 23 formed in the outer surface of the hub 17. Manifestly by opening the spring 22, it may be slipped from the hub to release the cup 20. This provides an exceedingly simple and convenient assembly which lends itself to economical production.

Mounted on the upper surface of the reel disk 18 are equidistantly spaced radially disposed graphite strips or rods 24 which project slightly above the surface of the disk and upon which the lower edge of the tape coil 19 rests. These rods may be adhesively secured to the disk and are of such length as to enable the lower edges of all of the tape convolutions to rest thereupon. These strips or rods are for the purpose of eliminating or dissipating static electricity generated during the operation of the reel and caused by the relative movement of adjacent convolutions. Reference is hereby made to my copending application, Serial No. 446,903, filed July 30, 1954, and entitled "Endless Magnetic Tape Cartridge" where a more complete description thereof is set forth.

Depending from the underside and integral with the cover panel 13 are curved sectional flange or wall members 25 which terminate short of the reel disk 18 and are arranged closely adjacent the peripheral portion. These flanges conform generally to the curvature of the outside of the tape coil and are disposed in relatively close juxtaposition thereto. The space between adjacent flanged sections accommodate the guide-rods and a portion of the magnetic tape as will hereinafter appear.

Extending through spaces between flange sections are guide wires 26 and 26' which are disposed on opposite sides and in close relation to the upper ends of the walls 21 of the cup or hub 20 and are suitably anchored at their opposite ends to posts or retaining members 27 attached by screws to the base wall or panel 11. The guide wire or rod 26 has a curved depressed portion **26*a* (Figure 3) which is adapted to engage the upper edges of the innermost convolutions of the tape rolls. These guide wires or rods serve to militate against the tape convolutions rising from the plane of the tape roll away from the graphite strips 24**, the action being that when a convolution rises from the plane of the upper edge of the tape roll and engages one of these guide rods, such convolutions during the rotation of the reel is ironed back toward and into engagement with the graphite strips thereby to insure that all portions of the tape roll engage the graphite strips for dissipating or equalizing any static charges developed during the operation of the tape roll.

The guide rod 26' also serves as a guide over which the tape from the inside of the tape roll passes so that it is spaced slightly from the upper edges of the tape convolutions and enables such portion of the tape to pass freely from the spiral roll. Thence the tape passes through a space between flanged sections 25 and over an upstanding plate guide 28 which is attached to and rises from the base panel 11, to a guide post or cylinder 30 mounted at one side of and at the front of a base panel 11. It will be understood that a tape loop 29 is provided and which extends along and parallel to the front wall 12 of the cartridge, a guide cylinder 31 being disposed at the opposite side of the cartridge upon the base panel 11 and about which the loop 29 passes. In this instance there are three cutouts at the front of the cartridge, one accommodating the guide cylinder 31 and enabling the driving capstan of the recording-playback instrument to engage the tape for driving the same. One of the cutouts serves to afford access to the tape by the transducer head as will also hereinafter appear.

The flange section 25 adjacent the guide cylinder 31 is formed with an integral extension **31*a* which terminates adjacent the cylinder 31 and assists in guiding the loop from the cylinder 31 to the outside of the tape roll. It will also be noted that the next adjacent flange section has an outwardly inclined extension 31*b* which also serves to guide the loop from the guide cylinder 31. Thus both sides of the loop are guided as it passes from the guide cylinder 31** to the periphery of the tape roll and militates against portions of the loop being fouled as for example by being jammed between the reel and housing walls.

Means are provided to restrain the tape reel from movement when it is not in use and for this purpose an elongate slot 33 is formed in the base panel 11 of the cartridge adjacent the guide cylinder 31 and substantially diametrically aligned with that cylinder. A spring arm 34 has one end secured to an anchor lug 35 fixed to the base panel 11 and suitably connected to the free end of the spring arm 34 is a shoe 36 with which is integral a substantially inverted L-shaped arm 37, the end portion of which transversely spans the slot 33. Integral with the shoe 36 is an inwardly extending lug or tooth 38 which is adapted to enter one or another of an annular series of notches 39 extending completely around and formed on the periphery of the disk or reel plate 18. Thus normally the tooth 38 engages in a notch 39 to hold the tape reel stationary, the spring 34 normally urging the tooth into notch engagement. As will hereinafter appear, the tooth 38 is automatically moved away from engagement with a notch 39 when the cartridge is mounted on the recording-playback instrument and the latter operated.

Figure 4:
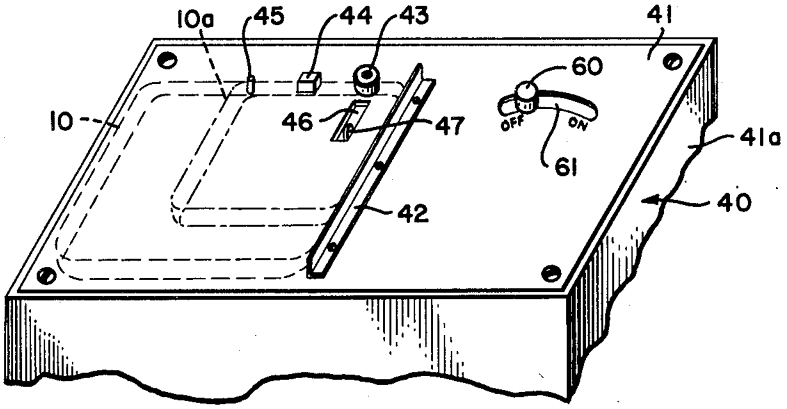
Figure 4 is a fragmentary perspective view showing the recording-playback instrument and the manner in which different size cartridges are mounted thereon.

The recording-playback instrument particularly designed to accommodate the cartridge above described is generally designated at 40 and has a top panel 41 suitably attached to a substantially rectangular box **41*a* containing the usual electrical equipment required for operating and recording on or reproducing from the magnetic tape but since the same forms no part of the present invention, description and illustration thereof are not deemed necessary. Suitably secured to the top panel 41 about midway of its length is a flanged guide 42 providing an elongate guide strip against which one side of the tape cartridge 10 is adapted to abut. Shown by broken lines on Figure 4 are two tape cartridges 10 designating the larger cartridge and 10*a*** the smaller cartridge, thus indicating that the instrument can handle different size cartridges without change or adjustment.

Near the front of the guide 42 and spaced inwardly therefrom is a drive capstan 43 which is a rotating cylinder driven by a suitable electric motor (not shown). The drive capstan is adjacent a transducer head 44 and both the capstan and transducer head are adapted to extend into two of the cutouts 32 respectively as above described in connection with the tape cartridge. Substantially in alignment with the transducer head and drive capstan is a stop pin 45 against which the front end of the cartridge abuts in order correctly to position it relative to the operating members.

Directly in rear of the drive capstan is an elongate slot 46 with which the slot 33 of the tape cartridge is adapted to register. Having a portion of its upper end extending through the slot 46 is a trigger 47 which is adapted to extend into the slot 33 of the tape cartridge to engage the end portion 37 of the brake shoe 36 successively to release the brake and free the tape reel and urge the guide cylinder 31 against the drive capstan 43. Thus the tape is pinched between the drive capstan and the guide cylinder for imparting translatory movement to the tape loop as will be readily understood.

Figure 5:
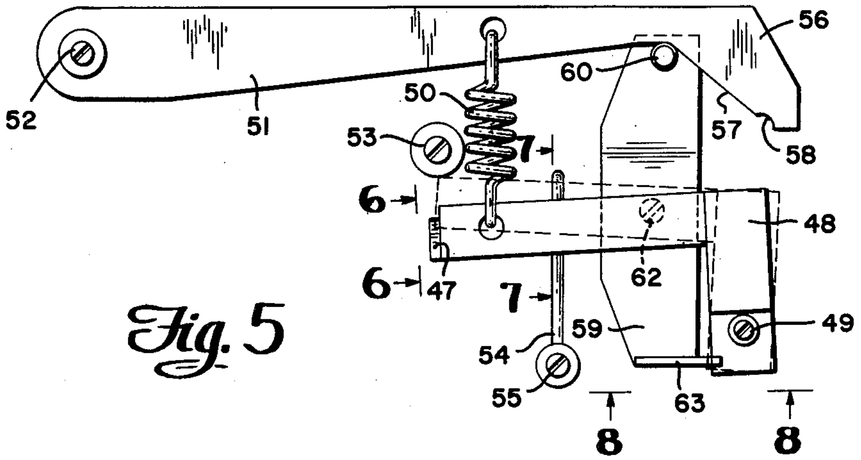
Figure 5 is a top plan view of the mechanism contained within the recording-playback instrument which operates to urge the cartridge to playing position when the instrument is operated.
Figure 6:
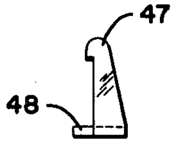
Figure 6 is a view substantially on the line 6—6 of Figure 5 showing the tape cartridge engaging finger.

As shown in Figures 5 and 6 the trigger 47 constitutes a vertically disposed finger, the upper end of which is hooked and the lower end of which is integral with a horizontally disposed L-shaped lever arm 48. The arm 48 is pivoted at 49 and is urged in a clockwise direction (Figure 5) by a helical spring 50 one end of which is hooked to the free end portion of the arm 48 and the opposite end of which is hooked to an intermediate portion of a relatively long control arm 51. The arm 51 is pivoted at one end as indicated at 52 and for limiting such tensioned movement of the arm 48 a stop 53 is arranged to be engaged by the free end portion of the arm 48.

Figure 7:
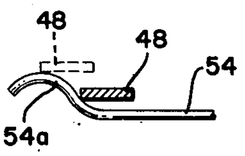
Figure 7 is a view substantially on the line 7—7 of Figure 5.

The operating end of the trigger 47 is lifted vertically so that it will extend upwardly and forwardly through the slot 46 and into the slot 33 of the cartridge and this action is caused by a cam arm 54 (Figures 5 and 7). One end of the arm 54 is secured to an anchor post 55 and the free end of the arm 54 has an upwardly curved cam end portion **54*a* over which the arm 48 rides when it is moved toward the stop 53 by the spring 50**.

The free end portion of the elongate arm 51 has an inclined cam surface 57 which terminates in a notch 58. Disposed beneath the L-shaped arm 48 is a control lever 59 which is intermediately pivoted on a pin 62 and has an operating knob 60, a portion of which extends through an arcuate slot 61 in the top panel 41 of the instrument 40. A portion of the knob 60 disposed beneath the panel 41 engages the cam surface 57 so that when the knob 60 is moved from its "off" to its "on" position, it may enter the notch 58 to retain the parts in this position. Such movement causes the arm 51 to swing upwardly (Figure 4) by means of the spring 50 impart clockwise movement to the L-shaped arm 48 causing the latter to ride over the cam **54*a* to lift the trigger 47 and at the same time move it forwardly to release the brake from the tape reel and then impose a forward movement to the cartridge to insure that the tape is properly pinched between the drive capstan 43 and the guide cylinder 31 and at the same time cause the transducer head 44** to engage the tape.

Figure 8:
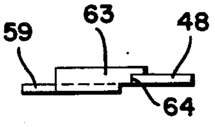
Figure 8 is a view substantially on the line 8—8 of Figure 5.

When the operating knob 60 is in its "off" position an upstanding flange 63 integral with the opposite end of the control lever 59 provides a stop for limiting any clockwise movement of the arm 48, there being a stepped notch 64 (Figure 8) in the flange 63 to receive the end of the arm 48 and hold it against such clockwise movement. However, the movement of the knob 60 to its "on" position moves the flange 63 away from the arm 48 to allow the latter to rock and enable the trigger 47 to be moved as above explained. The movement of the operating knob 60 back to its "off" position relieves the tension on the spring 50 and the rocking engagement of the control lever 59 to the position shown by full lines in Figure 4, enables the flange 63 to rock the L-shaped arm 48 back to its original position, the latter moving off from the cam **54*a*** so that the trigger retracts from the slots to an inoperative out-of-the-way position.

It will be apparent that I have produced an exceedingly simple and efficient magnetic tape cartridge which can handle much greater length of tape than has heretofore been possible in a single cartridge and without the necessity of threading the tape from one reel to another as ordinarily required by most recording-playback instruments. The endless tape is so mounted that it has free and unrestricted movement, eliminating troublesome piling up of tape which has heretofore not infrequently occurred. The dissipation or equalization of static electricity generated during the operation of the tape reel is also of importance. A feature of outstanding importance is the adaptation of the cartridge to the instrument so that different size cartridge can be applied to the same instrument. The mechanism on the instrument is such as to hold the cartridge in playing position without the necessity of making adjustments other than the actuation of the operating switch knob to the play or "on" position.

Numerous changes in details of construction, arrangement and operation may be effected without departing from the spirit of the invention, especially as defined in the appended claims.

What I claim is:

1. In a single-reel magnetic type cartridge for use with a recording play-back machine of the type having drive means for lengthwise advancing the tape in one direction past a transducer head: a housing having spaced top and bottom walls and having an open end; a reel mounted in the housing for rotation on an upright axis, said reel having a coaxial hub and having a flange at one end of the hub normal to the reel axis and flatwise overlying the bottom wall of the housing; an endless spirally coiled roll of magnetic tape on said reel encircling the hub thereof and edgewise supported by said flange, said roll having a loop of tape projecting therefrom toward the open end of the housing with one portion of the loop projecting from the convolution at the outer diameter of the roll, another portion of the loop projecting from the convolution at the inner diameter of the roll and an intermediate portion of the loop being exposed at the open end of the housing for cooperation with the drive means and transducer head of a recording play-back machine which is to receive the cartridge so that lengthwise advancing motion may be imparted to the loop to effect stripping of tape from the inner diameter of the roll and rotation of the reel in the direction to wind up tape on the outer diameter of the roll; a series of elongated graphite strips substantially radially mounted on the reel flange and projecting slightly from the upper face thereof to be engaged by the lower edges of the tape convolutions for spacing the same from the adjacent face of the flange, said strips providing for lubricating the tape convolutions as a consequence of the abrasive action of the convolutions thereupon produced by relative lengthwise movement of the convolutions relative to one another and to the reel which results from winding up the tape on a diameter of the roll larger than that at which the tape is stripped from the roll; an elongated guide member carried by the housing, said guide member extending across the upper face of the roll of tape closely adjacent to the upper edges of the roll convolutions and substantially tangent to the inner diameter of the roll, said guide member being positioned to act upon convolutions of the roll that may creep upwardly into contact therewith in a manner to direct such convolutions downwardly into edgewise engagement with said graphite strips to assure lubrication of the convolutions and dissipation of static charges on the tape generated by the relative motion between the roll convolutions, and wall means extending about the peripheral edge of the reel for preventing the tape from fouling, said wall means including a pair of side by side extension walls for confining that portion of the tape passing from the loop to the outer diameter of the roll.

2. In a single-reel magnetic type cartridge for use with a recording play-back machine of the type having drive means for lengthwise advancing the tape in one direction past a transducer head: a housing having spaced top and bottom walls and having an open end; a reel mounted in the housing for rotation on an upright axis, said reel having a coaxial hub and having a flange at one end of the hub normal to the real axis and flatwise overlying the bottom wall of the housing; an endless spirally coiled roll of magnetic tape on said reel encircling the hub thereof and edgewise supported by said flange, said roll having a loop of tape projecting therefrom toward the open end of the housing with one portion of the loop projecting from the convolution at the outer diameter of the roll, another portion of the loop projecting from the convolution at the inner diameter of the roll and an intermediate portion of the loop being exposed at the open end of the housing for cooperation with the drive means and transducer head of a recording play-back machine which is to receive the cartridge so that lengthwise advancing motion may be imparted to the loop to effect stripping of tape from the inner diameter of the roll and rotation of the reel in the direction to wind up tape on the outer diameter of the roll; a series of elongated graphite strips substantially radially mounted on the reel flange and projecting slightly from the upper face thereof to be engaged by the lower edges of the tape convolutions for spacing the same from the adjacent face of the flange, said strips providing for lubricating the tape convolutions as a consequence of the abrasive action of the convolutions thereupon produced by relative lengthwise movement of the convolutions relative to one another and to the reel which results from winding up the tape on a diameter of the roll larger than that at which the tape is stripped from the roll; an elongated guide member carried by the housing, said guide member extending across the upper face of the roll of tape closely adjacent to the upper edges of the roll convolutions and substantially tangent to the inner diameter of the roll, said guide member having a downwardly bowed intermediate portion to act upon convolutions of the roll that may creep upwardly into contact therewith in a manner to direct such convolutions downwardly into edgewise engagement with said graphite strips to assure lubrication of the convolutions and dissipation of static charges on the tape generated by the relative motion between the roll convolutions, and wall means extending about the peripheral edge of the reel for preventing the tape from fouling, said wall means including a pair of side by side extension walls for confining that portion of the tape passing from the loop to the outer diameter of the roll 3. In a single-reel magnetic type cartridge for use with a recording play-back machine of the type having drive means for lengthwise advancing the tape in one direction past a transducer head: a housing having spaced top and bottom walls and having an open end; a reel mounted in the housing for rotation on an upright axis, said reel having a coaxial hub and having a separate flange structure fitting said hub, fastener means detachably securing said flange structure to said hub; an endless spirally coiled roll of magnetic tape on said reel encircling the hub thereof and edgewise supported by said flange, said roll having a loop of tape projecting therefrom toward the open end of the housing with one portion of the loop projecting from the convolution at the outer diameter of the roll, another portion of the loop projecting from the convolution at the inner diameter of the roll and an intermediate portion of the loop being exposed at the open end of the housing for cooperation with the drive means and transducer head of a recording play-back machine which is to receive the cartridge so that lengthwise advancing motion may be imparted to the loop to effect stripping of tape from the inner diameter of the roll and rotation of the reel in the direction to wind up tape on the outer diameter of the roll; a series of elongated graphite strips substantially radially mounted on the reel flange and projecting slightly from the upper face thereof to be engaged by the lower edges of the tape convolutions for spacing the same from the adjacent face of the flange, said strips providing for lubricating the tape convolutions as a consequence of the abrasive action of the convolutions thereupon produced by relative lengthwise movement of the convolutions relative to one another and to the reel which results from winding up the tape on a diameter of the roll larger than that at which the tape is stripped from the roll; an elongated guide member carried by the housing, said guide member extending across the upper face of the roll of tape closely adjacent to the upper edges of the roll convolutions and substantially tangent to the inner diameter of the roll, said guide member being positioned to act upon convolutions of the roll that may creep upwardly into contact therewith in a manner to direct such convolutions downwardly into edgewise engagement with said graphite strips to assure lubrication of the convolutions and dissipation of static charges on the tape generated by the relative motion between the roll convolutions, and wall means extending about the peripheral edge of the reel for preventing the tape from fouling, said wall means including a pair of side by side extension walls for confining that portion of the tape passing from the loop to the outer diameter of the roll.

4. In a single-reel magnetic type cartridge for use with a recording play-back machine of the type having drive means for lengthwise advancing the tape in one direction past a transducer head: a housing having spaced top and bottom walls and having an open end; a reel mounted in the housing for rotation on an upright axis, said reel having a coaxial hub and having a flange; an endless spirally coiled roll of magnetic tape on said reel encircling the hub thereof and edgewise supported by said flange, said roll having a loop of tape projecting therefrom toward the open end of the housing with one portion of the loop projecting from the convolution at the outer diameter of the roll, another portion of the loop projecting from the convolution at the inner diameter of the roll and an intermediate portion of the loop being exposed at the open end of the housing for cooperation with the drive means and transducer head of a recording play-back machine which is to receive the cartridge so that lengthwise advancing motion may be imparted to the loop to effect stripping of tape from the inner diameter of the roll and rotation of the reel in the direction to wind up tape on the outer diameter of the roll; a series of elongated graphite strips substantially radially mounted on the reel flange and projecting slightly from the upper face thereof to be engaged by the lower edges of the tape convolutions for spacing the same from the adjacent face of the flange, said strips providing for lubricating the tape convolutions as a consequence of the abrasive action of the convolutions thereupon produced by relative lengthwise movement of the convolutions relative to one another and to the reel which results from winding up the tape on a diameter tof the roll larger than that at which the tape is stripped from the roll; an elongated guide member carried by the housing, said guide member extending across the upper face of the roll of tape closely adjacent to the upper edges of the roll convolutions and substantially tangent to the inner diameter of the roll but positioned beneath said other portion of the loop which projects from the inner diameter of the roll to guide the tape stripped from the roll and constrain it to travel flatwise over the upper face of the roll in spaced relation thereto, said guide member being positioned to act upon convolutions of the roll that may creep upwardly into contact therewith in a manner to direct such convolutions downwardly into edgewise engagement with said graphite strips to assure lubrication of the convolutions and dissipation of static charges on the tape generated by the relative motion between the roll convolutions, and a second guide member on the opposite side of said hub and having an intermediate downwardly bowed portion to act upon the innermost convolutions of the roll.

5. In a single-reel magnetic type cartridge for use with a recording play-back machine of the type having drive means for lengthwise advancing the tape in one direction past a tranducer head: a housing having spaced top and bottom walls and having an open end; a reel mounted in the housing for rotation on an upright axis, said reel having a coaxial hub and having a flange; an endless spirally coiled roll of magnetic tape on said reel encircling the hub thereof and edgewise supported by said flange, said roll having a loop of tape projecting therefrom toward the open end of the housing with one portion of the loop projecting from the convolution at the outer diameter of the roll, another portion of the loop projecting from the convolution at the inner diameter of the roll and an intermediate portion of the loop being exposed at the open end of the housing for cooperation with the drive means and transducer head of a recording play-back machine which is to receive the cartridge so that lengthwise advancing motion may be imparted to the loop to effect stripping of tape from the inner diameter of the roll and rotation of the reel in the direction to wind up tape on the outer diameter of the roll; a series of elongated graphite strips substantially radially mounted on the reel flange and projecting slightly from the upper face thereof to be engaged by the lower edges of the tape convolutions for spacing the same from the adjacent face of the flange, said strips providing for lubricating the tape convolutions as a consequence of the abrasive action of the convolutions thereupon produced by relative lengthwise movement of the convolutions relative to one another and to the reel which results from winding up the tape on a diameter of the roll larger than that at which the tape is stripped from the roll; and elongated guide member carried by the housing, said guide member extending across the upper face of the roll of tape closely adjacent to the upper edges of the roll convolutions and substantially tangent to the inner diameter of the roll but positioned beneath said other portion of the loop which projects from the inner diameter of the roll to guide the tape stripped from the roll and constrain it to travel flatwise over the upper face of the roll in spaced relation thereto, said guide member being positioned to act upon convolutions of the roll that may creep upwardly into contact therewith in a manner to direct such convolutions downwardly into edgewise engagement with said graphite strips to assure lubrication of the convolutions and dissipation of static charges on the tape generated by the relative motion between the roll convolutions, an annular series of notches on the peripheral edge of the reel, a spring-tensioned tooth member normally engaging a notch to restrain the reel from turning, a slot in the bottom wall, and an arm on said tooth member accessible through said slot for releasing the member from the notched periphery.

6. In combination with a recording play-back instrument having a rotatable drive capstan and a transducer head arranged closely in a row, an endless magnetic tape cartridge comprising a housing closed except for openings to receive said capstan and transducer head, a single spiral roll of tape within said housing having a loop guided to pass said openings and fed from the center of the roll and delivered to the outside of the roll, a rotatable reel in the housing supporting said roll, an elongate slot in the bottom wall of the housing, a finger carried by said instrument to enter said elongate slot and movable to urge the cartridge into operative engagement with said capstan and transducer head, and means for actuating said finger for effecting such movement.

7. In combination with a recording play-back instrument having a rotatable drive capstan and a transducer head arranged closely in a row, an endless magnetic tape cartridge comprising a housing closed except for openings to receive said capstan and transducer head, a single spiral roll of tape within said housing having a loop guided to pass said openings and fed from the center of the roll and delivered to the outside of the roll, a rotatable reel in the housing supporting said roll, a spring-tensioned brake operating against the reel for normally restraining same from turning, an arm connected to said brake, an elongate slot in the bottom wall of the housing through which access to said arm is had, a finger carried by said instrument to enter said elongate slot and movable to engage said arm for releasing said brake and then to urge the cartridge into operative engagement with said capstan and transducer head, and means for actuating said finger for effecting such movement.

8. In combination with a recording play-back instrument having a rotatable drive capstan and a transducer head arranged closely in a row, an endless magnetic tape cartridge comprising a housing closed except for openings to receive said capstan and transducer head, a single spiral roll of tape within said housing having a loop guided to pass said openings and fed from the center of the roll and delivered to the outside of the roll, a rotatable reel in the housing supporting said roll, a spring-tensioned brake operating against the reel for normally restraining same from turning, an arm connected to said brake, an elongate slot in the bottom wall of the housing through which access to said arm is had, a finger carried by said instrument to enter said elongate slot and movable to engage said arm for releasing said brake and then to urge the cartridge into operative engagement with said capstan and transducer head, a control member for said instrument movable between operative and inoperative positions, and a series of means between said control member and finger whereby operative movement is imparted to the finger when the control member is moved to inoperative position.

References Cited in the file of this patent

UNITED STATES PATENTS

| | | |
|---|---|---|
| 2,615,989 | Thad | Oct. 28, 1952 |
| 2,647,750 | Camras | Aug. 4, 1953 |